US012670544B2

(12) United States Patent
Chanchlani et al.

(10) Patent No.: US 12,670,544 B2
(45) Date of Patent: Jun. 30, 2026

(54) SYSTEM AND METHOD OF APPLYING DYNAMIC RESOLUTION

(71) Applicant: QUALCOMM Incorporated, San Diego, CA (US)

(72) Inventors: Pankaj Chanchlani, Ajmer (IN); Suresh Agarwal, Bangalore (IN); Mohammed Ataur Rahman Shuman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 528 days.

(21) Appl. No.: 18/183,843

(22) Filed: Mar. 14, 2023

(65) Prior Publication Data

US 2024/0311961 A1 Sep. 19, 2024

(51) Int. Cl.
| | |
|---|---|
| *G06T 3/4046* | (2024.01) |
| *G06T 1/20* | (2006.01) |
| *G06T 1/60* | (2006.01) |
| *G09G 5/36* | (2006.01) |
| *G09G 5/373* | (2006.01) |
| *G09G 5/391* | (2006.01) |

(52) U.S. Cl.
CPC .............. *G06T 3/4046* (2013.01); *G06T 1/20* (2013.01); *G06T 1/60* (2013.01); *G09G 5/363* (2013.01); *G09G 5/373* (2013.01); *G09G 5/391* (2013.01); *G09G 2340/04* (2013.01); *G09G 2340/0407* (2013.01); *G09G 2354/00* (2013.01); *G09G 2360/08* (2013.01)

(58) Field of Classification Search
None
See application file for complete search history.

(56) References Cited

U.S. PATENT DOCUMENTS

| | | | |
|---|---|---|---|
| 2014/0225927 A1 | 8/2014 | Choi | |
| 2018/0284872 A1* | 10/2018 | Schluessler | ........... G06F 1/3265 |
| 2023/0154432 A1* | 5/2023 | Rastogi | .................. G09G 5/363 |
| | | | 345/699 |

FOREIGN PATENT DOCUMENTS

| | | |
|---|---|---|
| WO | 2016114859 A1 | 7/2016 |
| WO | 2022014885 A1 | 1/2022 |

OTHER PUBLICATIONS

Partial International Search Report—PCT/US2024/013306—ISA/EPO—Apr. 23, 2024.
International Search Report and Written Opinion—PCT/US2024/013306—ISA/EPO—Jul. 16, 2024.

* cited by examiner

*Primary Examiner* — Michael J Cobb
(74) *Attorney, Agent, or Firm* — Loza & Loza LLP

(57) ABSTRACT

An apparatus, including: a screen generator configured to generate a screen in response to an application; a resolution selector configured to select a resolution for rendering the screen based on a set of parameters associated with the screen; and a graphics processing unit (GPU) configured to render the screen based on the selected resolution on a display.

24 Claims, 9 Drawing Sheets

| SCREEN PARAMETERS | PRIORITY |
|---|---|
| SCREEN OBJECT TYPE | |
| TEXTUAL | 1 |
| IMAGE | 2 |
| VIDEO | 4 |
| IMAGE/VIDEO SIZE IN SCREEN | |
| PIP MODE (10%) | 0.5 |
| SPLIT SCREEN 25/50/75% | 1/3/5 |
| FULL SCREEN | 8 |
| RAM REQUIRED | |
| LIGHT (<200 MB) | 0.2 |
| MILD (200-500 MB) | 0.5 |
| MODERATE (500-800 MB) | 0.8 |
| HEAVY (>800 MB) | 1 |
| PROCESSOR (CPU/GPU) USAGE | |
| LIGHT (0.5-1 GHz) | 1.5 |
| MODERATE (1-2 GHz) | 3 |
| HIGH (>2 GHz) | 4.5 |
| CURRENT RESOURCE STATUS | |
| RAM REMAINING | 0.25 |
| BATTERY LIFE REMAINING | 0.5 |
| CURRENT CPU USAGE | 2 |

FIG. 3

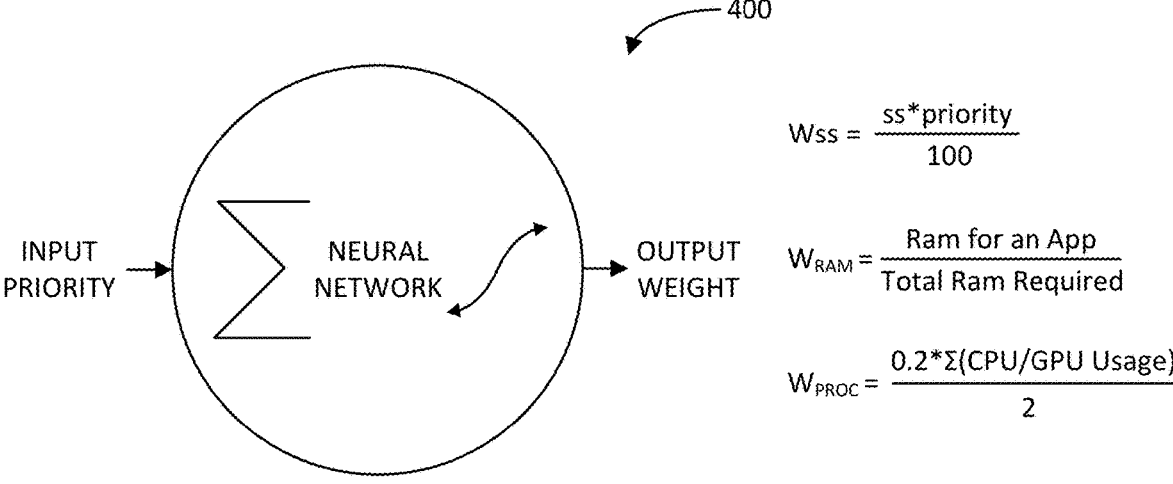

400

INPUT PRIORITY → NEURAL NETWORK → OUTPUT WEIGHT $$W_{ss} = \frac{ss*priority}{100}$$

$$W_{RAM} = \frac{Ram\ for\ an\ App}{Total\ Ram\ Required}$$

$$W_{PROC} = \frac{0.2*\Sigma(CPU/GPU\ Usage)}{2}$$

$$T = pixel_i - \frac{pixel_{i-1} + pixel_{i+1}}{2}$$

$$g(x,y) = \begin{cases} 1 & f(x,y) > T \\ 0 & f(x,y) \leq T \end{cases}$$

$$f(x,y) = pixel_i - pixel_j$$

800

SUB_VIEW 810
(E.G., BACKGROUND SOLID COLOR)
Z=1

SUB_VIEW 820
(E.G., IMAGE/VIDEO)
Z=2

SUB_VIEW 830
(E.G., BACKGROUND SOLID COLOR)
Z=1

900

| SCREEN OBJECTS/ATTRIBUTES | PRIORITY |
|---|---|
| OBJECT TYPE | |
| TEXTUAL | 2 |
| IMAGE | 4 |
| VIDEO | 8 |
| OBJECT Z-ORDER | |
| LOW ELEVATION (Notification) | 1 |
| MID ELEVATION (Button/Text View) | 2 |
| HIGH ELEVATION (Video View) | 4 |
| OBJECT LOCATION | |
| UPPER | 2 |
| MIDDLE | 4 |
| LOWER | 3 |
| OBJECT TRANSPARENCY | |
| ALPHA | 0.25 |
| OPAQUE | 0.75 |

| | VideoView | SurfaceView | ToastView | TouchView | TextView | ButtonView | CheckBox | TimePicker |
|---|---|---|---|---|---|---|---|---|
| Interaction | 0.72 | 0.88 | 0.21 | 0.46 | 0.56 | 0.41 | 0.31 | 0.38 |
| View Size | 0.68 | 0.82 | 0.19 | 0.39 | 0.41 | 0.32 | 0.27 | 0.30 |
| Screen View Angle | 1.23 | 1.5 | 0.72 | 0.98 | 0.89 | 0.82 | 0.59 | 0.67 |
| Z-Order | 2.65 | 3.1 | 0.82 | 1.34 | 1.21 | 1.11 | 0.98 | 0.107 |
| Transparency | 2.95 | 3.6 | 1.1 | 1.88 | 1.51 | 1.38 | 1.28 | 1.21 |
| Final Value After Assigning Weights | 2.95 | 3.6 | 1.1 | 1.88 | 1.51 | 1.38 | 1.28 | 1.21 |
| Normalization | 0.59 | 0.63 | 0.17 | 0.45 | 0.52 | 0.42 | 0.29 | 0.33 |

SYSTEM AND METHOD OF APPLYING DYNAMIC RESOLUTION

FIELD

Aspects of the present disclosure relate generally to graphical screen displaying, and in particular, to a system and method of applying dynamic resolution to graphical screens to be displayed.

BACKGROUND

A computing device, such as a mobile device or smart phone, may render a screen on a display based on an application or operating system. The resolution for rendering the screen on the display is typically manually set, either in the factory (default setting) and/or by a user. A high resolution for rendering a screen may require significant resources and exhibit rendering latencies compared to rendering a screen with a lower resolution. However, from a user experience perspective, a screen may be better rendered at a higher resolution, especially if it includes significant images or video, and is used often by a user. On the other hand, if a screen includes only texts superimposed on a solid color background and is used infrequently by a user, rendering the screen at a higher resolution may not significantly impact the user experience, while unnecessarily expending significant resources and introducing unnecessarily latencies.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus includes a screen generator configured to generate a screen in response to an application; a resolution selector configured to select a resolution for rendering the screen based on a set of parameters associated with the screen; and a graphics processing unit (GPU) configured to render the screen based on the selected resolution on a display.

Another aspect of the disclosure relates to a method of rendering a screen on a display. The method includes selecting at least one resolution for rendering the screen based on a set of parameters associated with the screen; and rendering the screen with the at least one selected resolution on the display.

Another aspect of the disclosure relates to a wireless communication device. The wireless communication device includes a display; a screen generator configured to generate a screen; a resolution selector configured to select a resolution for rendering the screen based on a set of parameters associated with the screen; and a graphics processing unit (GPU) configured to render the screen with the selected resolution on the display.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

BRIEF DESCRIPTION OF THE DRAWINGS

FIG. 3 illustrates a table of graphical screen parameters and resolution-influencing priorities in accordance with another aspect of the disclosure.

FIG. 4 illustrates a block diagram of an example neural network for generating resolution-influencing weights in accordance with another aspect of the disclosure.

FIG. 11B illustrates a table depicting example resolution priorities for screen objects and parameters associated with a resolution selection neural network in accordance with another aspect of the disclosure.

DETAILED DESCRIPTION

Figure 1:
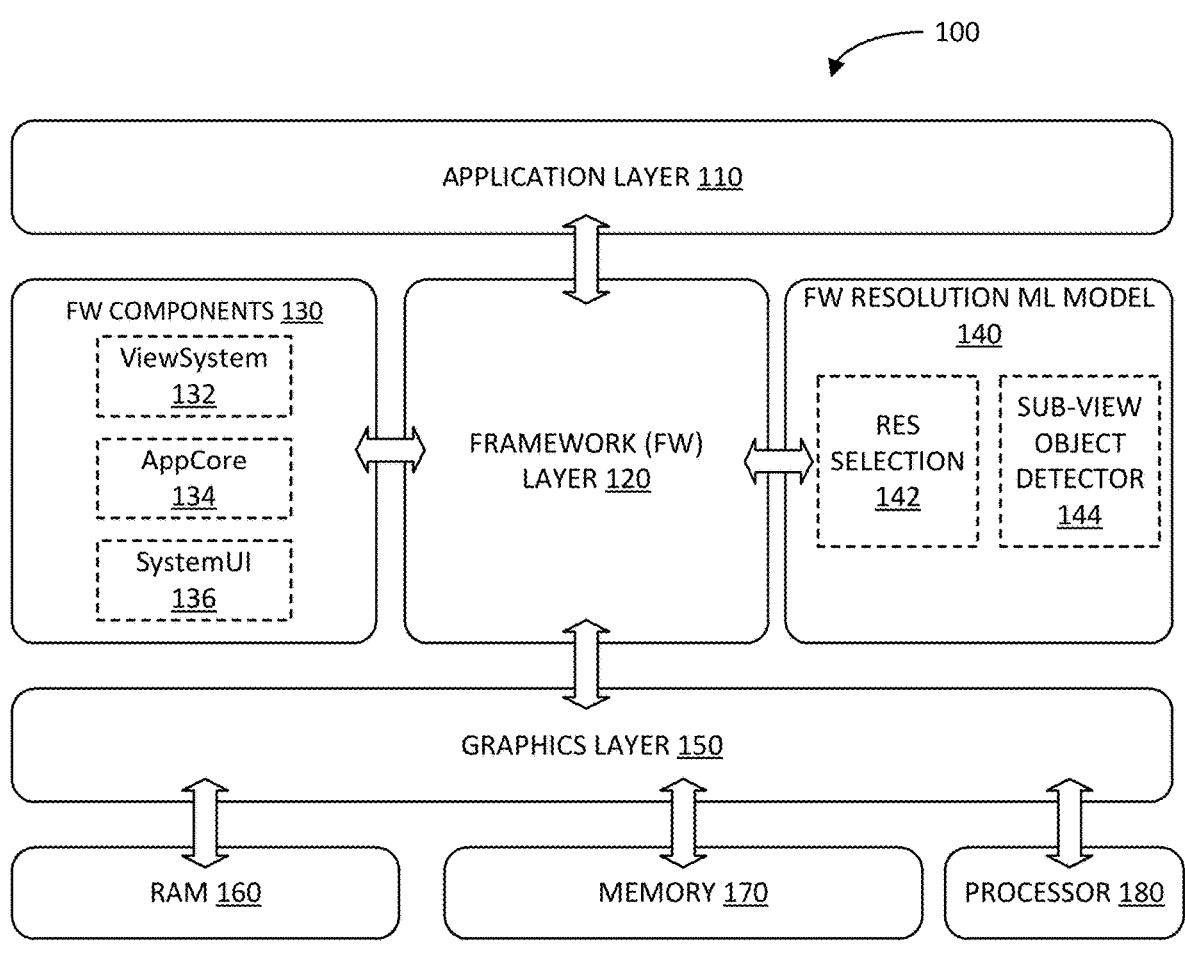
FIG. 1 illustrates a block view of an example graphical screen generating architecture in accordance with an aspect of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A mobile device or smart phone typically has many applications that may be run, and provide user with information and control via one or more graphical screens. The content of graphical screens depends on the particular application and the purpose of the screens. For example, graphical screens may provide information in the form of texts, images, videos, and also provide user controllable features such as control buttons, check buttons, radio buttons, etc. Although the concepts described herein are with reference to mobile devices or smart phones, it shall be understood that the concepts may applied across any device that produces graphical screens on a display.

In the past, a mobile device generates graphical screen on a display based on a fixed manually set or default resolution. For example, such resolution options include Standard Definition (SD) (e.g., 720×480 pixels$^2$), High Definition (HD) (e.g., 1080×720 pixels$^2$), Full High Definition (FHD) (1920×1080 pixels$^2$), and Wide Quad High Definition (WQHD) (e.g., 2560×1440 pixels$^2$). The selected resolution typically impacts the resource usage and performance of the mobile device. For example, a higher resolution requires more random access memory (RAM), higher clock frequency processing by central processing unit (CPU) and graphical processing unit (GPU), higher battery consumption, higher processing latency, increased application launch time, delays associated with application switching, and higher heat production, etc.

However, from a user experience perspective, a higher resolution option (e.g., FHD or WQHD) need not be necessary depending on the application and content of its one or more graphical screens. For example, applications that produce screens with texts in front of a solid color background (e.g., a calendar, calculator, clock, or other similar applications) need not be rendered on a display with a high resolution as the various resolution options does not significantly affect the user experience with such applications. As a result, the mobile device may unnecessarily consume too many resources and have performance degradation due to the selected higher resolution option without improving user experience.

On the other hand, a lower resolution option (e.g., SD or HD) may impact user experience for applications that produce screens with significant images and video (e.g., internet television, video streaming, video conferencing, games, etc.). Furthermore, user experience may be impacted by how frequently an application or screen object/feature (e.g., button) is used. For example, if a certain application or screen object is used frequently, from a user experience perspective, it may be better to render the corresponding screens and/or screen objects with one of the higher resolution options (e.g., FHD or WQHD). On the other hand, if a certain application or screen object is rarely used, it may be better to render the corresponding screens or screen object with one of the lower resolution options (e.g., SD or HD), as the impact on user experience would be minimal and would not consume significant resources and impact performance.

FIG. 1 illustrates a block view of an example display screen generating architecture 100 in accordance with an aspect of the disclosure. The display screen generating architecture 100 includes an application layer 110, a framework layer 120 including associated framework (FW) components 130 and a framework (FW) resolution machine learning (ML) model component 140, a graphics layer 150, and a set of hardware components including random access memory (RAM) 160, non-volatile memory 170, and a processor 180 (e.g., a central processing unit (CPU) and graphics processing unit (GPU)). It shall be understood that the display screen generating architecture 100 is just an example, and may have different configurations.

The application layer 110 includes user-installed applications, and interfaces with the framework (FW) layer 120 to provide generate user interface screens for providing information to and receiving control from a user in accordance with the application functionality. The FW components 130, in turn, may include a ViewSystem component 132, an application core (AppCore) component 134, and a system user interface (SystemUI) component 136. The FW resolution ML model component 140 may include a resolution selector 142 and a sub-view/object detector (separator) component 144, as discussed in more detail further herein.

With further regard to the FW components 130, the ViewSystem component 132 includes the basic building blocks (e.g., screen objects) from which the framework (FW) layer 120 produces a graphical user interface for a mobile device under the control of an application. The AppCore component 134 includes factory-installed or core default applications of a mobile device (e.g., camera, photo gallery, clock, calculator, email, etc.). The SystemUI component 136 enables mobile device users to control and customize display screens, which are independent of user applications launched from the application layer 110.

With regard to the FW resolution ML model components 140, as discussed further herein in more detail, in one implementation, the resolution component 142 may select a resolution for a screen based on content of the screen (e.g., its screen objects), resource requirements (e.g., RAM and CPU/GPU speed), current state of resources (e.g., RAM remaining, battery remaining, current CPU usage), and historical information regarding user activity with regard to the associated application. The framework (FW) layer 120 then uses the selected resolution to generate a screen for rendering by the graphics layer 150 (e.g., graphics processing unit (GPU)).

In another implementation, the sub-view/object detector 144 may detect a set of sub-views of a screen, and the resolution selector 142 may select the resolution for each of the sub-views based on its screen objects, resource requirements (e.g., RAM and CPU/GPU speed), current state of resources (e.g., RAM remaining, battery remaining, current CPU usage), and historical information regarding user activity with regard to the associated application. The framework (FW) layer 120 then uses the selected resolutions for the sub-views to generate a screen for rendering by the graphics layer 150.

In still another implementation, the sub-view/object detector 144 may detect a set of screen objects (e.g., text, video, image, buttons, etc.) of a screen, and the resolution selector 142 may select the resolution for each screen object based on object type and attributes (e.g., by accessing the screen object associated with different resolution (e.g., dot per inch (DPI) folders). The framework (FW) layer 120 then uses the selected resolutions for the screen objects to generate a screen for rendering by the graphics layer 150.

Figure 2:
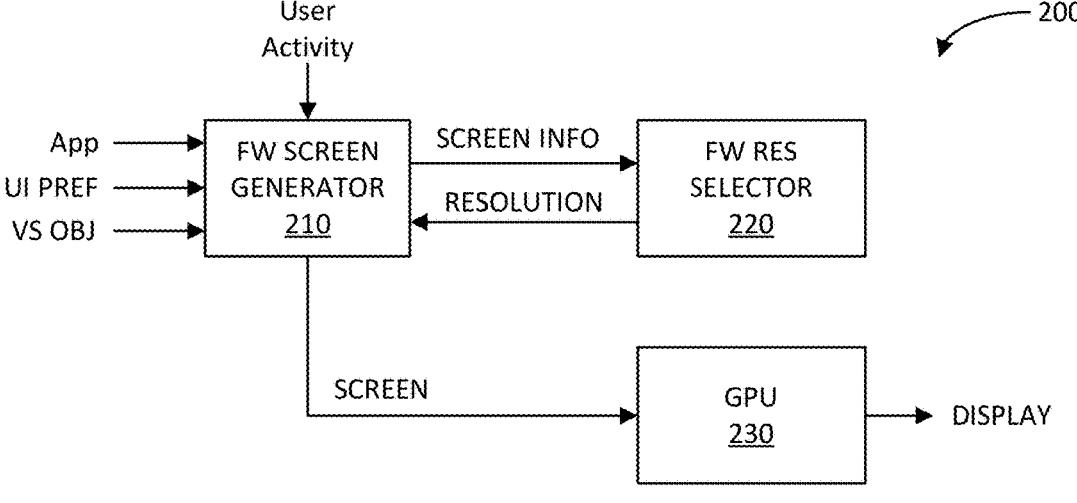
FIG. 2 illustrates a block diagram of an example graphical screen generating apparatus using screen dynamic resolution in accordance with another aspect of the disclosure.

FIG. 2 illustrates a block diagram of an example display screen generating apparatus 200 in accordance with another aspect of the disclosure. The display screen generating apparatus 200 includes a framework (FW) layer screen generator 210, a framework (FW) layer resolution selector or selector 220, and a graphics layer component 230 (e.g., a GPU). The FW screen generator 210 may generate screen information or parameters based on inputs from an application, user interface (UI) preferences, and ViewSystem screen objects. The screen information describes the content of and system parameters associated with a screen to be displayed.

As discussed in more detail further herein, the FW resolution selector 220 receives the screen information from the FW screen generator 210, and runs a machine learning algorithm (e.g., artificial intelligence (AI), neural network model, or the like) to select a resolution for the screen based on the screen information (e.g., text, image, video objects, screen size, etc.), system resource requirements to render the screen (e.g., required RAM and CPU/GPU usage), and current status of associated resources (e.g., RAM remaining, battery life remaining, current CPU usage). The FW resolution selector 220 then provides the selected resolution to the FW screen generator 210. Then the FW screen generator 210 may modify the selected resolution based on historical information associated with user activity with regard to the application. The FW screen generator 210 then generates the screen with the final resolution, and provides the screen to the GPU 230 for rendering on a display.

FIG. 3 illustrate a table of graphical screen parameters and resolution-influencing priorities in accordance with another aspect of the disclosure. The left column indicates the various screen parameters that are used for resolution selection. The right column indicates resolution priorities (corresponding to the screen parameters in the same rows) for selection of the resolution. The higher the resolution priority, the tendency for the FW resolution selector 220 to select a higher resolution. Conversely, the lower the resolution priority, the tendency for the FW resolution selector 220 to select a lower resolution. From top to bottom, the table is organized into several categories, including screen object type, image/video size in screen, RAM required, processor (CPU/GPU) usage, and current resource status.

With regard to screen object type, the screen parameters include textual object, image object, and video object. With regard to resolution priorities, a textual object may be assigned a relatively low priority (e.g., one (1)) as the resolution of rendering texts (whether high or low) does not significantly impact user experience. On the other hand, an image object may be assigned a higher priority than a text object (e.g., two (2)), as the resolution of an image typically impacts user experience more than the resolution of text. Similarly, a video object may be assigned an even higher priority (e.g., four (4)), as the resolution of a video typically impacts user experience more than the resolution of an image or text.

With regard to image/video object size in screen, the screen parameters include picture-in-picture (PIP) mode where the image/video object occupies a relatively small size in screen (e.g., 10%), split screen mode where the image/video object occupies one of different sizes in screen (e.g., 25/50/75%), and full screen mode where the image/video object occupies the full screen (e.g., 100%). With regard to resolution priorities, the larger the size in screen, the higher resolution priority. For example, the PIP mode may be assigned a relatively low resolution priority (e.g., 0.5). The split screen modes for 25, 50, and 75% size in screen may be assigned progressively higher resolution priorities (e.g., (one) 1, (three) 3, and (five) 5, respectively. The full screen size may be assigned the highest resolution priority in the size in screen category (e.g., eight (8)).

With regard to RAM required for rendering the screen, the screen parameters include light RAM usage (e.g., <200 mega Bytes (MB)), mild RAM usage (e.g., 200-500 MB), moderate RAM usage (e.g., 500-800 MB), and heavy RAM usage (>800 MB). With regard to resolution priorities, the greater RAM usage, the higher resolution priority. For example, light RAM usage may be assigned a relatively low resolution priority (e.g., 0.2). mild RAM usage may be assigned a higher resolution priority compared to light RAM usage (e.g., 0.5). Moderate RAM usage may be assigned an even higher resolution priority compared to mild RAM usage (e.g., 0.8). Heavy RAM usage may be assigned the highest resolution priority in the RAM usage category (e.g., one (1)).

With regard to processor (CPU/GPU) usage or clock frequency, the screen-associated system parameters include light (e.g., 0.5 to one (1) giga Hertz (GHz)), moderate (e.g., 1-2 GHZ), and high (e.g., >two (2) GHz). With regard to resolution priorities, the higher processor usage or clock frequency, the higher resolution priority. For example, light processor usage or speed may be assigned a relatively low resolution priority (e.g., 1.5). Moderate processor usage or speed may be assigned a mid-resolution priority (e.g., three (3)). High RAM usage may be assigned the highest resolution priority in the processor usage category (e.g., 4.5).

With regard to current resource status, the screen-associated system parameters include RAM remaining, battery life remaining, and current CPU usage. For example, with regard to RAM remaining, a relatively low resolution priority may be assigned (e.g., 0.25). With regard to battery life remaining, a mid-resolution priority may be assigned (e.g., 0.5). And, with regard to current CPU usage, a high resolution priority may be assigned (e.g., two (2)).

FIG. 4 illustrates a block diagram of an example neural network 400 for generating resolution-influencing weights in accordance with another aspect of the disclosure. The neural network 400 is configured to receive as inputs the priorities of the various screen parameters as listed in the table of FIG. 3, and arrive at a set of corresponding output weights based on a defined loss function, which may be based on user experience, resource usage, and available resources.

For example, an assigned weight $W_{SS}$ associated with the size in screen parameter may be given in accordance with the following equation:

$$W_{SS} = \frac{SS * \text{priority}}{100}$$

Where SS is the percent size in screen. Thus, for PIP mode where SS=10, the weight $W_{SS}$ may be 0.05 (e.g., 10*0.5/100) according to the above equation. For split screens 25, 50, and 75%, the weights $W_{SS}$ may be 0.25, 1.5, and 3.75 according to the above equation, respectively. For full screen, the weight $W_{SS}$ may be eight (8) according to the above equation.

An assigned weight $W_{RAM}$ associated with the RAM required parameter may be based on the percentage of RAM required by an application over the RAM required by the mobile device, which may be given in accordance with the following equation:

$$W_{RAM} = \frac{\text{RAM Required for an app}}{\text{Total RAM Required}}$$

An assigned weight $W_{PROC}$ associated with the processor (CPU/GPU) usage may be given in accordance with the following equation:

$$W_{PROC} = \frac{0.2 * \sum (CPU + GPU)\ Usage}{2}$$

Figure 5:
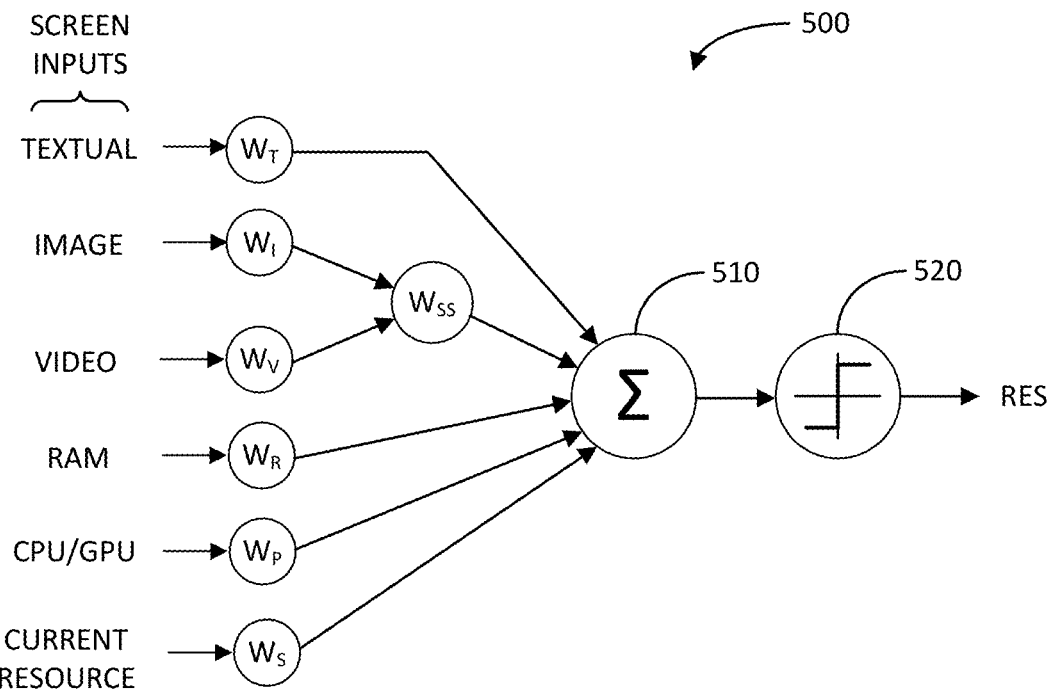
FIG. 5 illustrates a block diagram of an example screen resolution selection neural network in accordance with another aspect of the disclosure.

FIG. 5 illustrates a block diagram of an example screen resolution selection neural network 500 in accordance with another aspect of the disclosure. The screen resolution selection neural network 500 receives as inputs the screen parameters associated with a screen to be rendered. For example, the screen parameters may include a textual object, an image object, a video object, RAM required, processor (CPU/GPU) usage, and current resource status. The neural network 500 then applies corresponding weights $W_T$, $W_I$, $W_V$, $W_R$, $W_P$, and $W_S$ to the corresponding input screen parameters including the screen size weight $W_{SS}$ for the image and video object screen parameters. The weighted screen parameters are then accumulated by a summer 510. Then the cumulative weighted screen parameters is operated upon by an activation function 520 to generate the resulting selected resolution.

As some examples, if the screen to be rendered only includes textual objects, the RAM required is relatively low, the processor usage required is relatively low, and the current resource available is relatively low, the neural network 500 may arrive at a selected resolution that is relatively low (e.g., SD). On the other hand, if the screen to be rendered includes image and video objects, requires a lot of RAM to render the screen, requires a lot of processor usage to render the screen, and the current resource available is relatively high, the neural network 500 may arrive at a selected resolution that is relatively high (e.g., WQHD). Thus, the neural network 500 arrives at the resolution that provides an acceptable user experience without unnecessarily consuming too many resources while also considering available resources.

Figure 6:
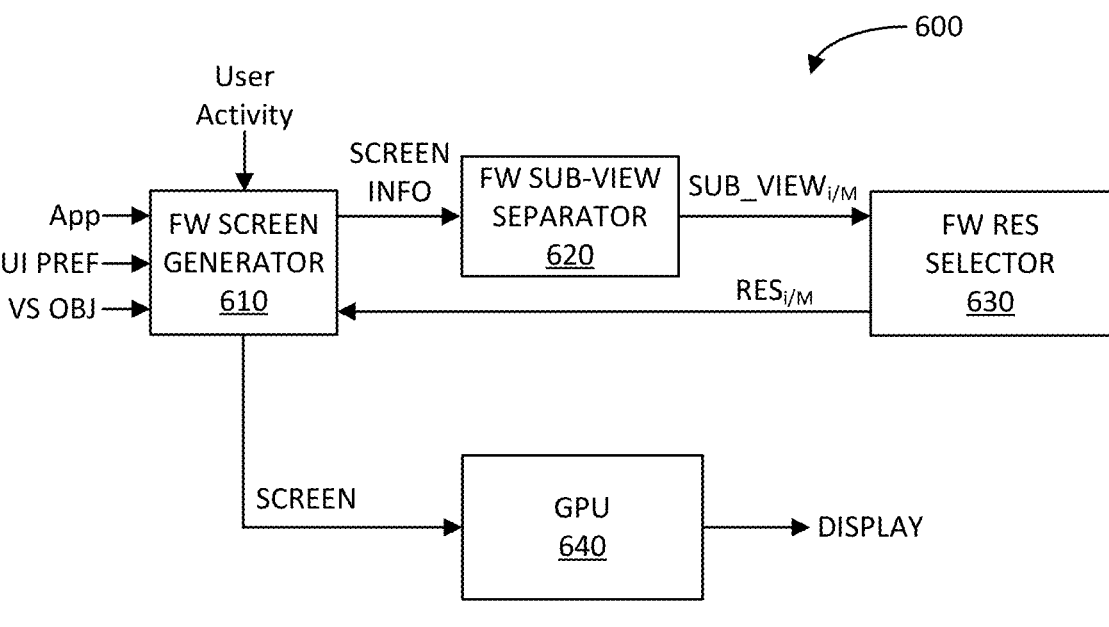
FIG. 6 illustrates a block diagram of another example graphical screen generating apparatus using screen sub-view dynamic resolution in accordance with another aspect of the disclosure.

FIG. 6 illustrates a block diagram of another example display screen generating apparatus 600 in accordance with another aspect of the disclosure. In screen generating apparatus 200, the selected resolution was applied to the entire screen. In screen generating apparatus 600, a set of selected resolutions are applied to a set of sub-views of a screen, respectively.

In particular, the display screen generating apparatus 600 includes a framework (FW) layer screen generator 610, an FW layer sub-view separator 620, a FW resolution selector 630, and a graphics layer component 640 (e.g., a GPU). The FW screen generator 610 may generate screen information based on inputs from an application, user interface (UI) preferences, and ViewSystem screen objects. The screen information or parameters describes the content of a screen to be displayed. The FW sub-view separator 620 parses or separates the different sub-views of the screen (e.g., M sub-views, where M is a positive integer number), and sequentially provides the sub-views (e.g., i=0 to M) to the FW resolution selector 630.

The FW resolution selector 630 sequentially receives the M sub-views$_{i/M}$ from the FW sub-view separator 620, and runs a machine learning algorithm (e.g., artificial intelligence (AI), neural network model, or the like) implemented by the neural network 500 to select a set of resolutions (RES$_{i/M}$) for the set of sub-views (sub-views$_{i/M}$ for i=1 to M) based on screen sub-view information or parameters (e.g., text, image, video objects, size in screen, etc.), resource requirements to render the sub-views (e.g., required RAM and CPU/GPU usage), current status of associated resources (e.g., RAM remaining, battery life remaining, current CPU usage). The FW resolution selector 630 then provides the set of selected resolutions (RES$_{i/M}$) to the FW screen generator 610. Then the FW screen generator 610 may modify one or more of the selected resolution (RES$_{i/M}$) based on historical information associated with user activity with the sub-views, screen, and/or application. The FW screen generator 610 then generates the screen including the sub-views and the corresponding selected resolutions, and provides the screen to the graphics layer component or GPU 640 for rendering on a display.

Figures 7, 8:
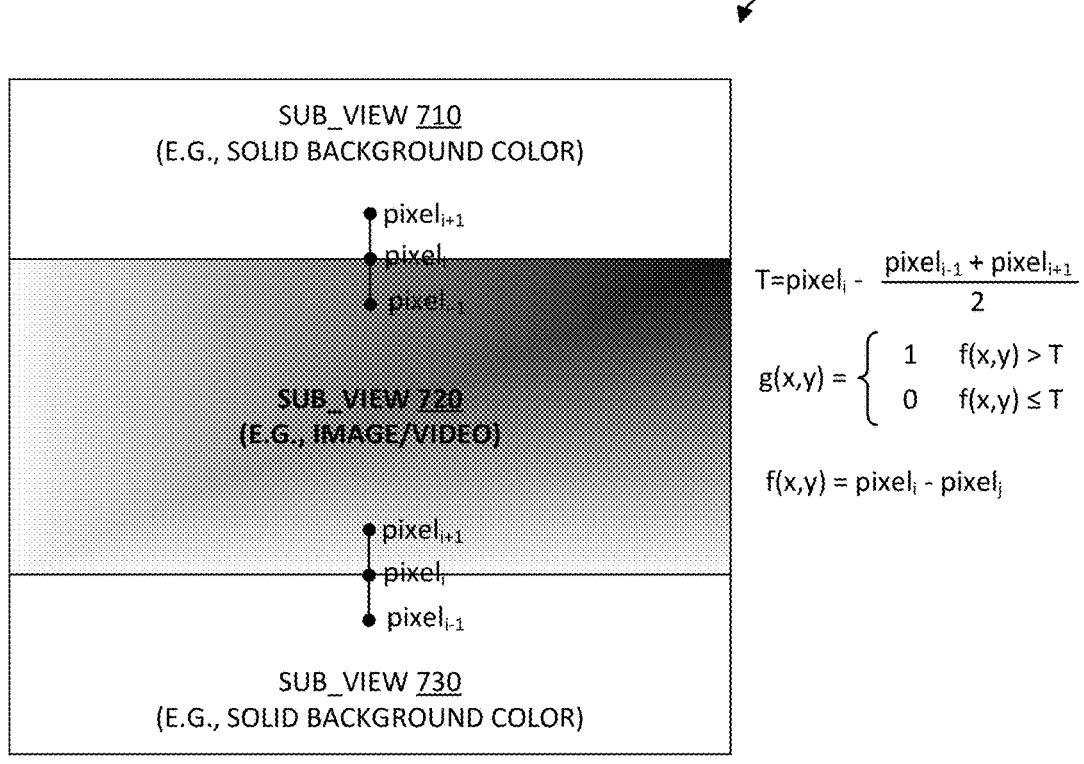
FIG. 7 illustrates a diagram related to an example method of separating different sub-views of a screen in accordance with another aspect of the disclosure.
FIG. 8 illustrates a diagram related to another example method of separating different sub-views of a screen in accordance with another aspect of the disclosure.

FIG. 7 illustrates a diagram related to an example method of separating different sub-views 710, 720, and 730 of a screen 700 in accordance with another aspect of the disclosure. The method may be implemented by the FW sub-view separator 620 to separate the various sub-views for resolution analysis by the FW resolution selector 630.

In particular, the sub-view 710 may be located at a top portion of the screen 700, and may be comprised of a solid background color or shade (e.g., a primary color, black, or white). Similarly, the sub-view 730 may be located at a bottom portion of the screen 700, and may also be comprised of a solid background color or shade (e.g., a primary color, black, or white). In this example, the sub-view 720 may be located in a middle portion of the screen 700, and may comprise an image or video.

The method of separating the different sub-views uses color/grayscale value of neighboring pixels or pixel densities analysis to identify the corners or boarders of the various sub-views. For example, the FW sub-view separator 620 may generate a threshold (T) used for identifying the corners or boarders of the various sub-views in accordance with the following equation:

$$T = pixel_i - \frac{pixel_{i-1} + pixel_{i+1}}{2}$$

where pixel$_i$ is the current pixel or pixel density undergoing analysis, pixel$_{i-1}$ is a neighboring pixel or pixel density on one side, and pixel$_{i+1}$ is a neighboring pixel or pixel density on the other side. Thus, the threshold (T) is related to the current pixel; minus the average of the pixels pixel$_{i-1}$ and pixel$_{i+1}$ on either side of the current pixel$_i$.

Note that within each of the sub-views 710, 720, and 730, the threshold (T) is relatively low or close to zero (0) (especially for a solid background color or shade). For example, within a solid background color, such as in sub-views 710 and 730, the threshold (T) is zero (0) as the color/shade value of the current pixel; is the same as the average for pixels$_{i-1}$ and pixel$_{i+1}$ on either side of the current pixel$_i$. Thus, the threshold (T) would be zero (0) (e.g., k−(k+k)/2=0, where k is the color/shade values of each of the current and neighboring pixels). Similarly, the threshold (T) for the image or video sub-view 720 may also be a relatively low value as color/shade variation for a small neighboring or pixel analysis region of an image or video may not vary significantly. However, at the corners or boards between the different sub-views 710 and 720, and 720 and 730, the threshold (T) would result in a relatively high number compared to the threshold within each of the different sub-views 710, 720, and 730. Thus, the threshold T may be set to a relatively small number.

The FW sub-view separator 620 then determines a neighboring pixel difference function f(x,y)=pixel$_i$−pixel$_j$ for the pixels of the screen 700, and compares the function value f(x,y) with the threshold T. Based on the comparison, the FW sub-view separator 620 determines a corner or boundary condition function g(x,y) by setting it to one (1) if the neighboring pixel difference function f(x,y) is greater than the threshold (T), and to zero (0) if the neighboring pixel difference function f(x,y) is less than or equal to the threshold (T). The corner or boundary condition function g(x,y) is a one (1) if the pixel$_i$ corresponds to a corner or boundary of a subview, and zero (0) if the pixel$_i$ does not correspond to a corner or boundary of a subview. In this manner, the corners or boundaries between sub-views may be determined and separated for running separate resolution selection algorithm on each of the sub-views as previously discussed.

FIG. 8 illustrates a diagram related to another example method of separating different sub-views 810, 820, and 830 of a screen 800 in accordance with other aspects of the disclosure. The method may be implemented by the FW sub-view separator 620 to separate the various sub-views of a screen. It shall be understood that the FW sub-view separator 620 may implement both methods of FIGS. 7-8 independently or in combination to detect separate sub-views of a screen.

According to this method, the FW sub-view separator 620 separates different sub-views 810, 820, and 830 according to the z-order associated with the sub-views. The z-order indicates the degree in which the corresponding sub-view is in the foreground and background of a screen. The higher z-order value, the more the corresponding sub-view is in the foreground. Conversely, the lower z-order value, the more the corresponding sub-view is in the background.

In this example, the top and bottom sub-views 810 and 830 of the screen 800 each have a z-order of one (1), and the middle sub-view 820 of the screen 800 has a z-order of two (2). This means that the middle sub-view 820 is more in the foreground than the top and bottom sub-views 810 and 830. As the z-order is associated with a sub-view, the FW sub-view separator 620 may detect different sub-views based on their respective z-orders, and provide them separately to the FW resolution selector 630 for selection of their respective resolutions, as previously discussed.

Figures 9, 10:
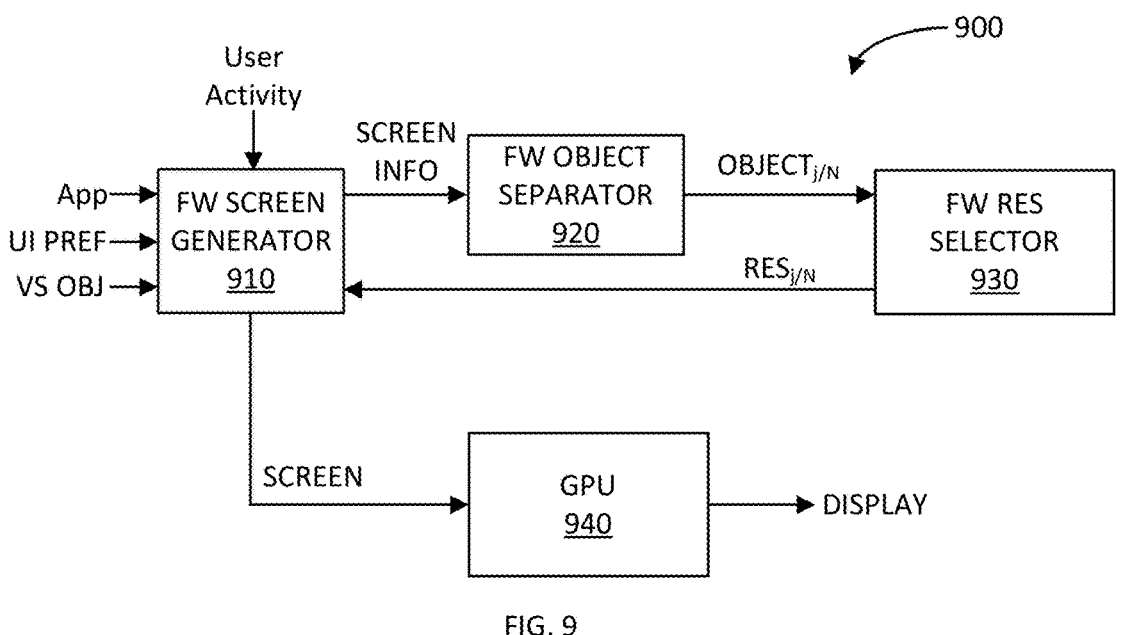
FIG. 9 illustrates a block diagram of another example graphical screen generating apparatus using dynamic resolution based on screen object type and attributes in accordance with another aspect of the disclosure.
FIG. 10 illustrates a table of screen objects and resolution-influencing priorities in accordance with another aspect of the disclosure.

FIG. 9 illustrates a block diagram of another example screen generating apparatus 900 in accordance with another aspect of the disclosure. In screen generating apparatus 600, the selected resolution was applied to each of a set of sub-views of a screen. In screen generating apparatus 900, the selected resolution is applied to each of a set of screen objects of a screen.

In particular, the display screen generating apparatus 900 includes a framework (FW) layer screen generator 910, an FW screen object separator 920, a FW resolution selector 930, and a graphics layer component (e.g., a GPU) 940. The FW screen generator 910 may generate screen information or parameters based on inputs from an application, user interface (UI) preferences, and ViewSystem screen objects. The screen information describes the content of a screen to be displayed. The FW screen object separator 920 parses or separates the different screen objects (e.g., N screen objects), and sequentially provides the screen objects (e.g., i=0 to N) to the FW resolution selector 930.

The FW resolution selector 930 sequentially receives the N screen objects$_{i/N}$ from the FW screen object separator 920, and runs a machine learning algorithm (e.g., artificial intelligence (AI), neural network model, or the like) implemented by a neural network (discussed further herein) to select a set of resolutions (RES$_{i/N}$) for the set of screen objects (object$_{i/M}$ for i=1 to N) based on an assigned priority associated with each screen object and attributes thereof.

The FW resolution selector 930 then provides the set of selected resolutions (RES$_{i/N}$) to the FW screen generator 910.

Then the FW screen generator 910 may modify one or more of the selected resolution (RES$_{i/N}$) based on historical information associated with user activity with the screen-objects. As an example, the FW screen generator 910 may promote the selected resolution of a screen object in accordance with the following relationship:

Selected Resolution=NN based resolution+Σ(user activity factor)

Where the NN based resolution is the resolution selected using the neural network algorithm, and user activity factor may be formulated in accordance with the following:

Σ(user activity factor)=Usage of screen object/(total number of screen objects)+time spent on application/total time spent on the mobile device.

Then the FW screen generator 910 generates the screen based on the screen objects and the corresponding selected resolutions, and provides the screen to the graphics layer component (GPU) 940 for rendering on a display.

FIG. 10 illustrate a table of screen objects and resolution-influencing priorities in accordance with another aspect of the disclosure. The left column indicates the various screen objects and attributes. The right column indicates resolution-influencing priorities for selection of the resolutions for the screen objects. Similarly, the higher the resolution priority, the tendency for the FW resolution selector 930 to select a higher resolution for the associated screen object. Conversely, the lower the resolution priority, the tendency for the FW resolution selector 930 to select a lower resolution for the associated screen object. From top to bottom, the table is organized into several categories, including screen object type, screen object z-order, screen object location, and screen object transparency.

With regard to screen object type, the screen parameters include textual object, image object, and video object. With regard to resolution priorities, a textual object may be assigned a relatively low priority (e.g., two (2)) as the resolution of rendering texts (whether high or low) does not significantly impact user experience. On the other hand, an image object may be assigned a mid-resolution priority (e.g., four (4)), as the resolution of an image typically impacts user experience more than the resolution of text. Similarly, a video object may be assigned a high priority (e.g., eight (8)), as the resolution of a video typically impacts user experience more than the resolution of an image or text.

With regard to the z-order (attribute) of a screen object, the z-order includes low elevation (e.g., common to notification text objects), mid elevation (e.g., common to button and text objects), and high elevation (e.g., common to video and image objects). With regard to resolution priorities, the greater the z-order of a screen object, the higher resolution priority. For example, a low elevation z-order screen object may be assigned a low resolution priority (e.g., one (1)). A mid elevation z-order screen object may be assigned a mid-resolution priority (e.g., two (2)). A high elevation z-order screen object may be assigned a high resolution priority (e.g., four (4)).

With regard to the location (attribute) of a screen object, the screen locations include upper, middle, and lower. With regard to resolution priorities, the middle of a screen is given a higher resolution as that is where a user more frequently and comfortably looks. For example, the upper screen location may be assigned a low resolution priority (e.g., two (2)). The middle screen location may be assigned a high resolution priority (e.g., four (4)). The lower screen location may be assigned a mid-resolution priority (e.g., three (3)).

With regard to the transparency (attribute) of a screen object, the transparency includes alpha (e.g., some degree of transparency) and opaque. With regard to resolution priorities, the opaque screen object attribute may be assigned a higher resolution priority than an alpha screen object attribute. For example, the alpha screen object attribute may be assigned a resolution priority of 0.25. The opaque screen object attribute may be assigned a resolution priority of 0.75.

Figure 11A:
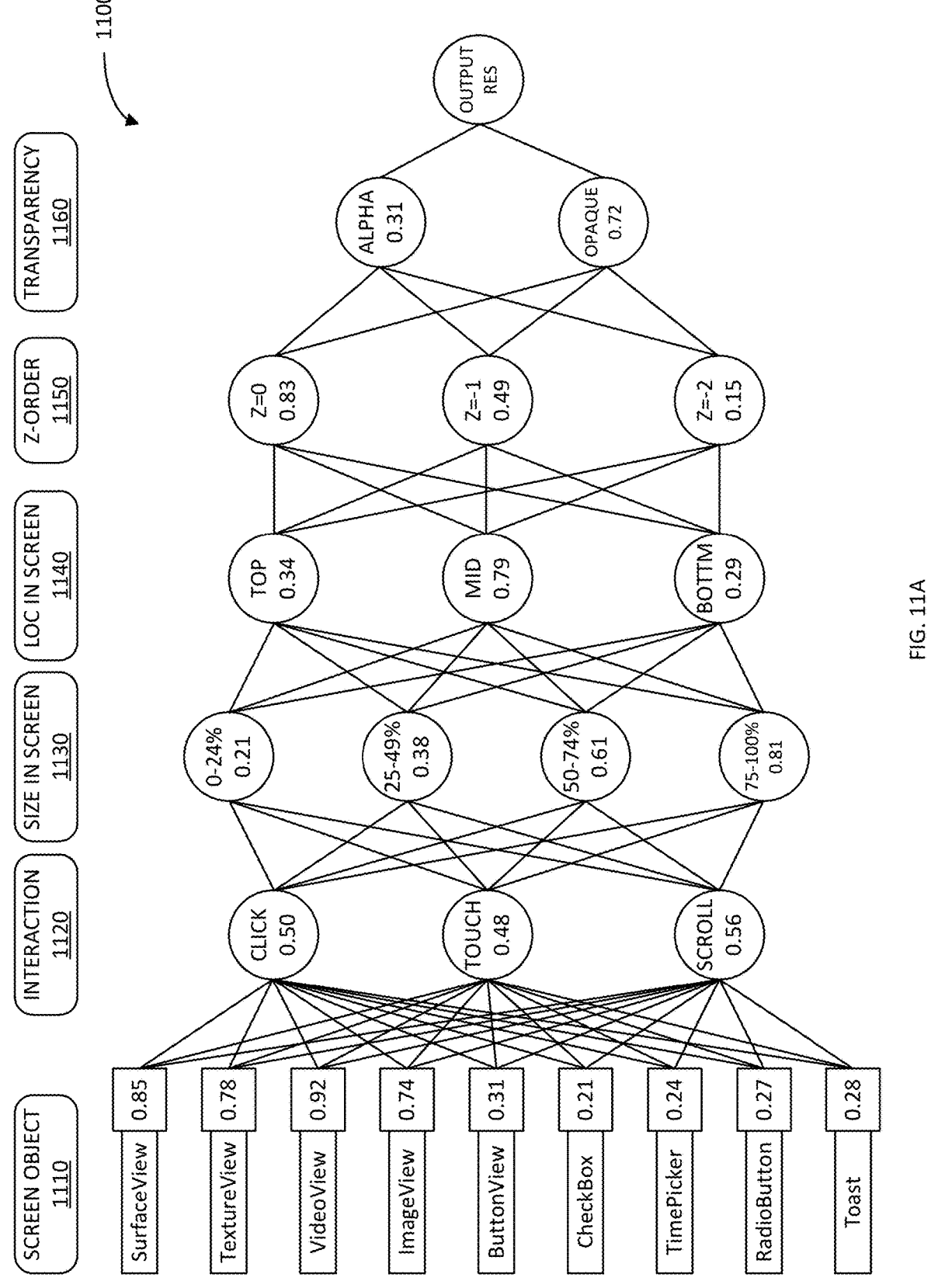
FIG. 11A illustrates a block diagram of an example screen object resolution selection neural network in accordance with another aspect of the disclosure.

FIG. 11A illustrates a block diagram of an example screen object resolution selection neural network 1100 in accordance with another aspect of the disclosure. The screen object resolution selection neural network 1100 may be employed by the FW resolution selector 930 of screen generating apparatus 900.

In particular, the screen object resolution selection neural network 1100 includes an input screen object layer 1110 including inputs and associated weights for a Surface View object (weight=0.85), a Texture View object (weight=0.78), a Video View object (weight=0.92), an Image View object (weight=0.74), a Button View object (weight=0.31), a CheckBox object (weight=0.21), a TimePicker object (weight=0.24), a RadioButton object (weight=0.27), and a Toast object (weight=0.28). The neural network 1100 further includes an interaction layer 1120 including weights 0.50, 0.48, and 0.48 for a clickable interaction, a touch interaction, and a scroll interaction, respectively. The neural network 1100 further includes a size in screen layer 1130 including weights 0.21, 0.38, 0.61, and 0.81 for different size in screen percentage ranges 0-24%, 25-49%, 50-74%, and 75-100%, respectively.

The screen object resolution selection neural network 1100 includes a location in screen layer 1140 including weights 0.34, 0.79, and 0.29 for top, middle, and bottom screen locations, respectively. Additionally, the neural network 1100 includes a z-order layer 1150 including weights 0.83, 0.49, and 0.15 for z=0 (most foreground), z=−1 (more in background), and z=−2 (most in background), respectively. Further, the neural network 1100 includes a transparency layer 1160 including weights 0.31 and 0.72 for alpha and opaque transparencies, respectively The type of input screen object 1110 and the various screen object attribute layers (interaction 1120, size in screen 1130, location in screen 1140, z-order 1150, and transparency 1160) influences the neural network 1110 to select a particular resolution (e.g., SD, HD, FHD, or WQHD) for the particular input screen object.

With regard to the input screen object 1110, input screen objects that are more image or graphical oriented have higher associated weights (e.g., >0.7) because their resolution have a higher impact on user experience. For example, Surface View object may be used to depict animation; TextureView object may be used to display a content stream, such as coming from a camera, a video, or other image motion sources; a VideoView object may be used to display a video file; and an Image View object may be used to display an image. On the other hand, input screen objects that are more textual oriented have lower associated weights (e.g., <0.35) because their resolution have a lower impact on user experience. For example, ButtonView object is used to display a button; CheckBox object is used to display a checkbox; TimePicker object is used to display a widget for selecting a time of day; RadioButton object is used to display a radio button; and Toast object is used to display a small popup window with a text message or notification.

With regard to the interaction layer 1120, the type of interaction associated with the input screen object may influence the selected resolution slightly. Generally, the more complex or responsive the interaction, the greater weight it is given for influencing a higher resolution selection. For example, if the input screen object provides for a clickable interaction (e.g., responsive), its weight (e.g., 0.50) may be slightly higher than the weight (e.g., 0.48) of an input screen object that provides a touch interaction, and slightly lower than the weight (e.g., 0.56) of an input screen object that provides a scrollable interaction (e.g., complex).

With regard to size in screen, the size of the input screen object may significantly influence the selected resolution. Generally, the larger the size in screen of an input screen object, the greater weight it is given for influencing a higher resolution selection. For example, if the input screen object has a size in screen between 0-24%, it may be given a weight of 0.21; if the input screen object has a size in screen between 25-49%, it may be given a weight of 0.38; if the input screen object has a size in screen between 50-74%, it may be given a weight of 0.61; and if the input screen object has a size in screen between 75-100%, it may be given a weight of 0.81.

With regard to location in screen, the location of the input screen object within a screen may significantly influence the selected resolution. Generally, the more an input screen object is situated within the middle of the screen, the greater weight it is given for influencing a higher resolution selection. For example, if the input screen object is situated within a defined top portion of a screen, it may be given a weight of 0.34; if the input screen object is situated within a defined middle portion of a screen, it may be given a weight of 0.79; and if the input screen object is situated within a defined bottom portion of a screen, it may be given a weight of 0.29.

With regard to z-order, the z-order of an input screen object may significantly influence the selected resolution. Generally, the more an input screen object is in the foreground as indicated by its z-order, the greater weight it is given for influencing a higher resolution selection. For example, if an input screen object has a z-order of zero (0), it may be given a weight of 0.83; if an input screen object has a z-order of minus one (−1), it may be given a weight of 0.49; and if an input screen object has a z-order of minus two (−2), it may be given a weight of 0.15.

With regard to transparency, the transparency of an input screen object may significantly influence the selected resolution. Generally, the more an input screen object is opaque, the greater weight it is given for influencing a higher resolution selection. For example, if an input screen object has an alpha transparency, it may be given a weight of 0.31; and if an input screen object is opaque, it may be given a weight of 0.72.

Accordingly, each screen object of a screen may be processed by the neural network 1100 to select a resolution for the screen object (e.g., selecting different DPI objects from different resolution folders). Assuming each of the input screen objects begin with a certain value, by the time all of the weights are applied to the input object, the output value of the neural network 1100 may be, for example, between substantially zero (0) to above 28. If the output value of the neural network 1100 is between zero (0) and eight (8), the neural network 1100 may select SD as the resolution for the screen object. If the output value of the neural network 1100 is between eight (8) and 18, the neural network 1100 may select HD as the resolution for the screen object. If the output value of the neural network 1100 is between eight 18 and 28, the neural network 1100 may select FHD as the resolution for the screen object. And, if the output value of the neural network 1100 is above 28, the neural network 1100 may select WQHD as the resolution for the screen object. As previously discussed, a user historical interaction with the screen object may promote the resolution selected by the neural network 1100 to a higher resolution (e.g., from SD to HD).

Another parameter that may be checked by the FW resolution selector is that the sum of all selected resolutions for screen objects of a screen should not exceed a base resolution (e.g., a base resolution selected by a neural network for rendering the entire screen). This is done so that the screen objection resolution selection reduces the overall resolution for the screen so that resources are saved for the mobile device. Thus, if the sum of all selected resolutions for the screen objects exceeds the base resolution, then the base resolution is selected to render the screen.

FIG. 11B illustrates a table depicting example resolution priorities for screen objects and parameters associated with a resolution selection neural network in accordance with another aspect of the disclosure. The table includes a set of columns identifying various screen objects (e.g., Android specific objects) including, from left-to-right, a Video View, Surface View, Toast View, Touch View, TextView, Button View, CheckBox, and TimePicker. The table also includes a set of rows identifying various screen parameters including, from top-to-bottom, Interaction, View Size, Screen View Angle, Z-Order, Transparency, Final Value after Assigning Weights, and Normalization. For each column-row pair, the table provides a resolution priority whose value influences a resolution selection neural network to arrive at a resolution for the corresponding screen object. The higher the resolution priority, the resolution selection neural network is influence to select a higher priority (and vice-versa).

Figure 12:
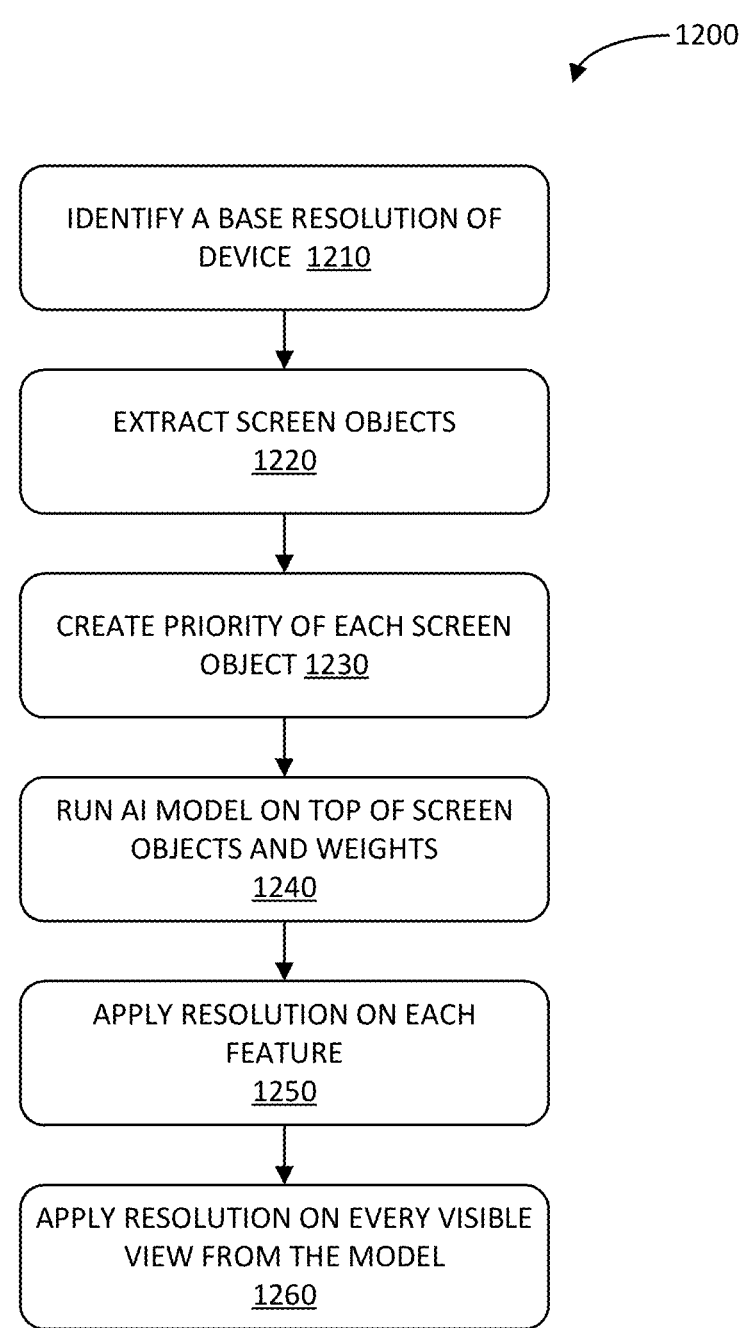
FIG. 12 illustrates a flow diagram of an example method of implementing dynamic resolution for a graphical screen in accordance with another aspect of the disclosure.

FIG. 12 illustrates an example method 1200 of implementing dynamic resolution for a screen in accordance with another aspect of the disclosure. The method 1200 may be implemented by the FW resolution selector 930.

The method 1200 includes identifying a base resolution of a device (block 1210). For example, the base resolution may be a neural network selected resolution for the entire screen. The method 1200 further includes extracting screen objects (block 1220). Additionally, the method includes creating a priority for each of the screen objects (block 1230). Then, according to the method 1200, an AI model is run on top of the screen objects and weights (block 1240). The method 1200 further includes applying the resolution on each of the screen objects (block 1250). Then, according to the method 1200, the resolution is applied on every visible view from the model (block 1260).

Figure 13:
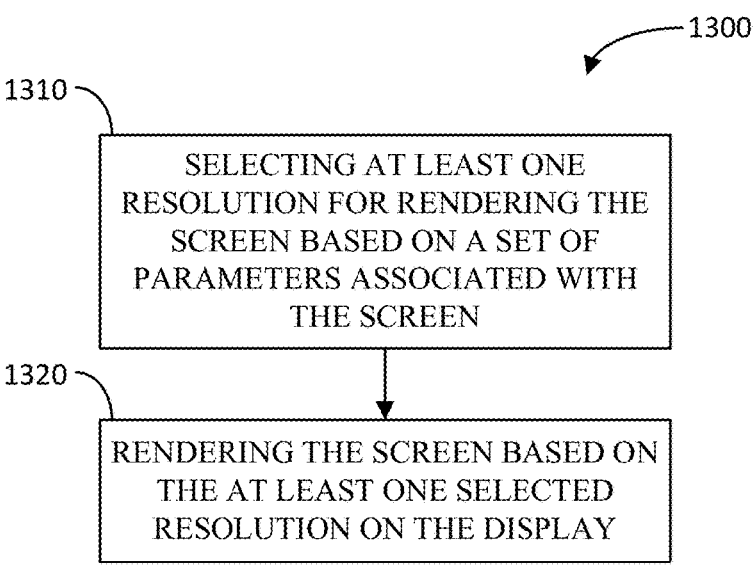
FIG. 13 illustrates a flow diagram of an example method of rendering a screen on a display in accordance with another aspect of the disclosure.

FIG. 13 illustrates a flow diagram of an example method 1300 of rendering a screen on a display in accordance with another aspect of the disclosure. The method 1300 includes selecting at least one resolution for rendering the screen based on a set of parameters associated with the screen (block 1310). Examples of means for selecting at least one resolution for rendering the screen based on a set of parameters associated with the screen include resolution selectors 220, 630, and 930. Further, the method 1300 includes rendering the screen based on the at least one selected resolution on the display (block 1320). Examples of means for rendering the screen based on the at least one selected resolution on the display include GPUs 230, 640, and 940.

Figure 14:
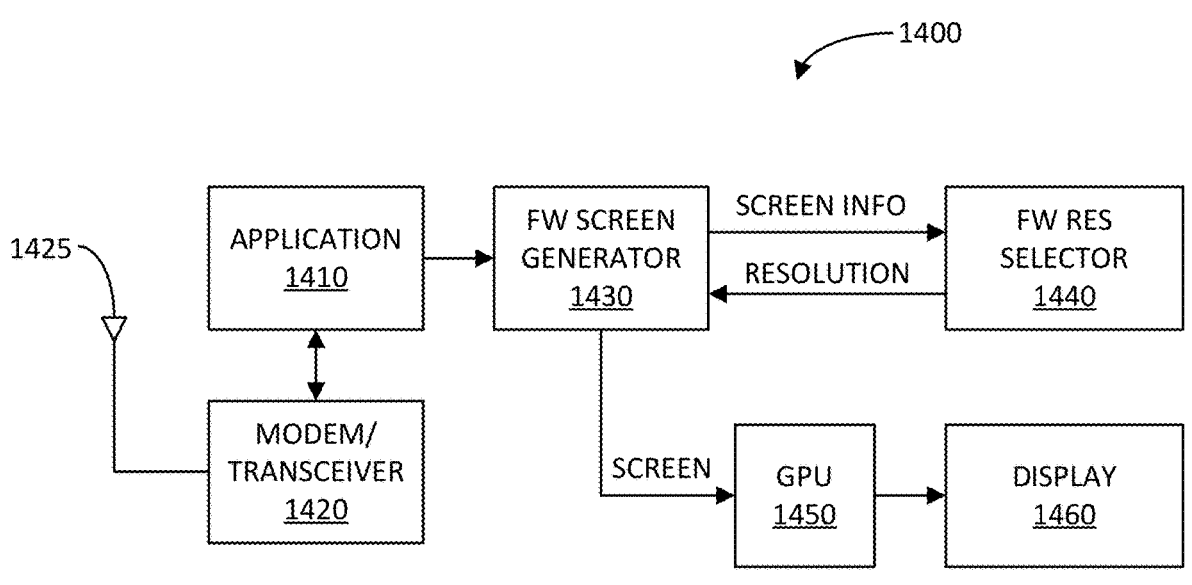
FIG. 14. illustrates a block diagram of an example wireless communication device in accordance with another aspect of the disclosure.

FIG. 14 illustrates a block diagram of an example wireless communication device 1400 in accordance with another aspect of the disclosure. The wireless communication device

1400, which may be implemented as a mobile device, smart phone, or other wireless device with one or more displays, includes an application layer 1410, a modem/transceiver 1420 with associated antenna 1425, a framework (FW) layer screen generator 1430, a FW resolution selector 1440, a graphics processing unit (GPU) 1450, and a display 1460.

The application layer 1410, which may be a factory installed application or a user installed application, may receive data from one or more remote wireless devices via the antenna 1425 and the modem/transceiver 1420. The application layer 1410 may then instruct the FW screen generator 1430 to generate a screen including at least a portion of the data received from the one or more remote wireless devices. The data may take the form of one or more of a text object, an image object, a video object, or other screen object.

The FW screen generator 1430, which may be implemented per FW screen generator 210, 610, or 910, may then generate a set of parameters (e.g., screen information) associated with the screen to be displayed, and provide the set of screen parameters to the FW resolution selector 1440. The FW resolution selector 1440, which may be implemented per the FW resolution selector 220, FW resolution selector 630 including the FW sub-view separator 620, or the FW resolution selector 930 including the FW object separator 920, is configured to select at least one resolution based on the set of screen parameters. The FW screen generator 1430 may then generate the screen to be rendered based on the at least one selected resolution, and provide the screen to the GPU 1450 for rendering on the display 1460.

Some of the components described herein, such as one or more of the subsystems, thermal controllers, and communication interfaces, may be implemented using a processor. A processor, as used herein, may be any dedicated circuit, processor-based hardware, a processing core of a system on chip (SOC), etc. Hardware examples of a processor may include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The processor may be coupled to memory (e.g., generally a computer-readable media or medium), such as a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

The following provides an overview of aspects of the present disclosure:

Aspect 1: An apparatus, comprising: a screen generator configured to generate a screen; a resolution selector configured to select a resolution for rendering the screen based on a set of parameters associated with the screen; and a graphics processing unit (GPU) configured to render the screen with the selected resolution on a display.

Aspect 2: The apparatus of aspect 1, wherein the set of parameters includes one or more types of screen objects of the screen.

Aspect 3: The apparatus of aspect 2, wherein the one or more types of screen objects includes any system user interface (UI) object including at least one of a text object, an image object, a video object, button, or Surface View.

Aspect 4: The apparatus of aspect 3, wherein the text object is assigned a first resolution priority, the image object is assigned a second resolution priority greater than the first resolution priority, and the video object is assigned a third resolution priority greater than the second resolution prior- ity, wherein a higher resolution priority influences a higher resolution for the selected resolution of the screen.

Aspect 5: The apparatus of aspect 4, wherein the resolu- tion selector comprises a neural network configured to determine the selected resolution based on the one or more of the first, second, or third resolution priority associated with a type of at least one of the text object, the image object, or the video object as an input to the neural network, respectively.

Aspect 6: The apparatus of aspect 4 or 5, wherein the resolution selector comprises a neural network configured to: generate first, second, and third weights based on the first, second, and third resolution priorities and a loss function based on user experience and resource consumption associated with rendering the screen; and determine the selected resolution based on the one or more of the first, second, or third weights associated with a type of at least one of the text object, the image object, or the video object as an input to the neural network, respectively.

Aspect 7: The apparatus of any one of aspects 2-5, wherein the one or more types of screen objects includes at least one of an image object or a video object, and wherein the set of parameters includes at least one size in screen associated with at least one of the image object or the video object, respectively.

Aspect 8: The apparatus of aspect 7, wherein the at least one size in screen is assigned at least one resolution priority whose value increases with a percent amount of the at least one size in screen of the at least one of the image object or the video object, respectively.

Aspect 9: The apparatus of aspect 8, wherein the resolu- tion selector comprises a neural network configured to determine the selected resolution based on the at least one resolution priority associated with a type of the least one of the image object or the video object as an input to the neural network, respectively.

Aspect 10: The apparatus of aspect 8 or 9, wherein the resolution selector comprises a neural network configured to: generate at least one weight based on the at least one resolution priority and a loss function based on user expe- rience and resource consumption associated with rendering the screen; and determine the selected resolution based on the at least one weight associated with at least one of the image object or the video object type as an input to the neural network, respectively.

Aspect 11: The apparatus of any one of aspects 1-10, wherein the set of screen parameters includes an amount of random access memory (RAM) required to render the screen on the display.

Aspect 12: The apparatus of aspect 11, wherein the amount of RAM required is assigned a resolution priority whose value is related to the amount of RAM required.

Aspect 13: The apparatus of aspect 12, wherein the resolution selector comprises a neural network configured to determine the selected resolution based on the resolution priority.

Aspect 14: The apparatus of any one of aspects 1-13, wherein the set of screen parameters includes a frequency of a clock for driving a processor used for rendering the screen on the display.

Aspect 15: The apparatus of aspect 14, wherein the frequency of the clock is assigned a resolution priority whose value is related to the frequency of the clock.

Aspect 16: The apparatus of aspect 15, wherein the resolution selector comprises a neural network configured to determine the selected resolution based on the resolution priority.

Aspect 17: The apparatus of any one of aspects 1-16, wherein the set of screen parameters includes a at least one of an amount of random access memory (RAM) available, an amount of battery life remaining, or a current usage of a processor used to render the screen on the display.

Aspect 18: The apparatus of aspect 17, wherein the resolution selector comprises a neural network configured to determine the selected resolution based on at least one resolution priority assigned to the at least one of the amount of RAM available, the amount of battery life remaining, or the current usage of the processor.

Aspect 19: The apparatus of any one of aspects 1-18, further comprising a screen sub-view separator configured to separate the screen into a set of sub-views, wherein the resolution selector is configured to select a set of resolutions for rendering the set of sub-views based on the set of parameters associated with the set of sub-views, respec- tively, and wherein the GPU is configured to render the screen including the sub-views with the set of selected resolutions on the display, respectively.

Aspect 20: The apparatus of aspect 19, wherein the screen sub-view separator is configured to separate the screen into the set of sub-views based on a set of pixel values of the set of sub-views, respectively.

Aspect 21: The apparatus of aspect 19 or 20, wherein the screen sub-view separator is configured to separate the screen into the set of sub-views based on a set of z-order values associated with the set of sub-views, respectively, wherein screen objects with the same z-order value are part of the same sub-view.

Aspect 22: The apparatus of any one of aspects 1-21, further comprising a screen object separator configured to separate the screen into a set of screen objects, wherein the resolution selector is configured to select a set of resolutions for rendering the set of screen objects based on the set of parameters associated with the set of screen objects, respec- tively, and wherein the GPU is configured to render the screen including the set of screen objects with the set of selected resolutions on the display, respectively.

Aspect 23: The apparatus of aspect 22, wherein the set of screen objects includes at least one of a text object, an image object, or a video object.

Aspect 24: The apparatus of aspect 23, wherein the text object is assigned a first resolution priority, the image object is assigned a second resolution priority greater than the first resolution priority, and the video object is assigned a third resolution priority greater than the second resolution prior- ity, wherein a higher resolution priority influences a higher resolution for the set of selected resolutions of the set of screen objects, respectively, and wherein the resolution selector includes a neural network configured to select the set of resolutions based on at least one of the first, second, or third priority associated with at type of at least one of the text object, the image object, or the video object as an input to the neural network, respectively.

Aspect 25: The apparatus of any one of aspects 22-24, wherein the set of screen objects is associated with a set of z-orders, wherein the set of z-orders are assigned a set of resolution priorities, and wherein the resolution selector includes a neural network configured to select the set of resolutions based on at least one of the set of resolution priorities associated with a type of at least one of the screen object type as an input to the neural network, respectively.

Aspect 26: The apparatus of any one of aspects 22-25, wherein the set of screen objects is associated with a set of locations in the screen, wherein the set of locations in the screen are assigned a set of resolution priorities with middle screen location having higher resolution priority than upper and lower screen locations, and wherein the resolution selector includes a neural network configured to select the set of resolutions based on at least one of the set of resolution priorities associated with at least one of the screen object type as an input to the neural network, respectively.

Aspect 27: The apparatus of any one of aspects 22-26, wherein the set of screen objects is associated with a set of screen object transparencies, wherein the set of screen object transparencies are assigned a set of resolution priorities, and wherein the resolution selector includes a neural network configured to select the set of resolutions based on at least one of the set of resolution priorities associated with a type of at least one of the screen object type as an input to the neural network, respectively.

Aspect 28: The apparatus of any one of aspects 1-27, wherein the selected resolution is modified based on user activity associated with the screen.

Aspect 29: A method of rendering a screen on a display, comprising: selecting at least one resolution for rendering the screen based on a set of parameters associated with the screen; and rendering the screen with the at least one selected resolution on the display.

Aspect 30: A wireless communication device, comprising: a display; a screen generator configured to generate a screen; a resolution selector configured to select a resolution for rendering the screen based on a set of parameters associated with the screen; and a graphics processing unit (GPU) configured to render the screen with the selected resolution on the display.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:
a screen generator configured to generate a screen;
a resolution selector configured to select a resolution for rendering the screen based on a set of parameters associated with the screen, wherein the set of parameters includes one or more types of screen objects of the screen, and wherein the one or more types of screen objects includes at least one of a text object, an image object, or a video object; and
a graphics processing unit (GPU) configured to render the screen based on the selected resolution on a display;

wherein the text object is assigned a first resolution priority, the image object is assigned a second resolution priority, and the video object is assigned a third resolution priority;
wherein the resolution selector comprises a neural network configured to:
receive the first resolution priority, the second resolution priority, and the third resolution priority;
generate, using a loss function based on resource consumption associated with rendering the screen, a first weight associated with the first resolution priority, a second weight associated with the second resolution priority, and a third weight associated with the third resolution priority; and
determine the selected resolution based on one or more of the first weight, the second weight, or the third weight as an input to the neural network.

2. The apparatus of claim 1, wherein the one or more types of screen objects includes any system user interface (UI) object including at least one of a button or Surface View.

3. The apparatus of claim 2, wherein the second resolution priority is greater than the first resolution priority, and the third resolution priority is greater than the second resolution priority, wherein a higher resolution priority influences a higher resolution for the selected resolution of the screen.

4. The apparatus of claim 3, wherein the resolution selector comprising the neural network is configured to determine the selected resolution further based on one or more of the first resolution priority associated with the text object, the second resolution priority associated with the image object, or the third resolution priority associated with the video object as an input to the neural network.

5. The apparatus of claim 1, wherein the set of screen parameters includes an amount of random access memory (RAM) required to render the screen on the display.

6. The apparatus of claim 5, wherein the amount of RAM required is assigned a resolution priority whose value is related to the amount of RAM required.

7. The apparatus of claim 1, wherein the set of screen parameters includes a frequency of a clock for driving a processor used for rendering the screen on the display.

8. The apparatus of claim 7, wherein the frequency of the clock is assigned a resolution priority whose value is related to the frequency of the clock.

9. The apparatus of claim 1, wherein the set of screen parameters includes a at least one of an amount of random access memory (RAM) available, an amount of battery life remaining, or a current usage of a processor used to render the screen on the display.

10. The apparatus of claim 9, wherein the neural network configured to determine the selected resolution based on at least one resolution priority assigned to the at least one of the amount of RAM available, the amount of battery life remaining, or the current usage of the processor.

11. The apparatus of claim 1, further comprising a screen sub-view separator configured to separate the screen into a set of sub-views, wherein the resolution selector is configured to select a set of resolutions for rendering the set of sub-views based on the set of parameters associated with the set of sub-views, and wherein the GPU is configured to render the screen including the sub-views with the set of selected resolutions on the display.

12. The apparatus of claim 11, wherein the screen sub-view separator is configured to separate the screen into the set of sub-views based on a set of pixel values of the set of sub-views.

13. The apparatus of claim 11, wherein the screen sub-view separator is configured to separate the screen into the set of sub-views based on a set of z-order values associated with the set of sub-views, wherein screen objects with the same z-order value are part of the same sub-view.

14. The apparatus of claim 1, further comprising a screen object separator configured to separate the screen into a set of screen objects, wherein the resolution selector is configured to select a set of resolutions for rendering the set of screen objects based on the set of parameters associated with the set of screen objects, and wherein the GPU is configured to render the screen including the set of screen objects with the set of selected resolutions on the display.

15. The apparatus of claim 14, wherein the set of screen objects includes at least one of the text object, the image object, or the video object.

16. The apparatus of claim 15, wherein the text object is assigned the first resolution priority, the image object is assigned the second resolution priority greater than the first resolution priority, and the video object is assigned the third resolution priority greater than the second resolution priority, wherein a higher resolution priority influences a higher resolution for the set of selected resolutions of the set of screen objects, and wherein the resolution selector including the neural network is configured to select the set of resolutions based on at least one of the first resolution priority associated with the text object, the second resolution priority associated with the image object, or the third priority resolution priority associated with the video object type as an input to the neural network.

17. The apparatus of claim 14, wherein the set of screen objects is associated with a set of z-orders, wherein the set of z-orders are assigned a set of resolution priorities, and wherein the resolution selector including the neural network is configured to select the set of resolutions based on at least one of the set of resolution priorities associated with a type of at least one of the screen objects as an input to the neural network.

18. The apparatus of claim 14, wherein the set of screen objects is associated with a set of locations in the screen, wherein the set of locations in the screen are assigned a set of resolution priorities with a middle screen location having a higher resolution priority than upper and lower screen locations, and wherein the resolution selector including the neural network is configured to select the set of resolutions based on at least one of the set of resolution priorities associated with a type of at least one of the screen objects as an input to the neural network.

19. The apparatus of claim 14, wherein the set of screen objects is associated with a set of screen object transparencies, wherein the set of screen object transparencies are assigned a set of resolution priorities, and wherein the resolution selector including the neural network is configured to select the set of resolutions based on at least one of the set of resolution priorities associated with a type of at least one of the screen objects as an input to the neural network.

20. The apparatus of claim 1, wherein the selected resolution is modified based on user activity associated with the screen.

21. An apparatus, comprising:
a screen generator configured to generate a screen;
a resolution selector configured to select a resolution for rendering the screen based on a set of parameters associated with the screen, wherein the set of parameters includes one or more types of screen objects of the screen, wherein the one or more types of screen objects includes at least one of an image object or a video object, and wherein the set of parameters includes at least one size in screen associated with the at least one of the image object or the video object;
wherein the at least one size in screen is assigned at least one resolution priority whose value increases with a percent amount of the at least one size in screen of the at least one of the image object or the video object;
wherein the resolution selector comprises a neural network configured to:
receive the at least one resolution priority;
generate, using a loss function based on resource consumption associated with rendering the screen, at least one weight associated with the at least one resolution priority; and
determine the selected resolution based on the at least one weight associated with the at least one of the image object or the video object as an input to the neural network.

22. The apparatus of claim 21, wherein the resolution selector comprising the neural network is configured to determine the selected resolution further based on the at least one resolution priority associated with the least one of the image object or the video object as an input to the neural network.

23. A method of rendering a screen on a display, comprising:
selecting, via a resolution selector, at least one resolution for rendering the screen based on a set of parameters associated with the screen, wherein the set of parameters includes one or more types of screen objects of the screen, and wherein the one or more types of screen objects includes at least one of a text object, an image object, or a video object; and
rendering, via a graphics processing unit (GPU), the screen with the at least one selected resolution on the display;
wherein the text object is assigned a first resolution priority, the image object is assigned a second resolution priority, and the video object is assigned a third resolution priority;
wherein the selecting the at least one resolution via the resolution selector comprises:
receive the first resolution priority, the second resolution priority, and the third resolution priority;
generating, using a loss function based on resource consumption associated with rendering the screen, a first weight associated with the first resolution priority, a second weight associated with the second resolution priority, and a third weight associated with the third resolution priority; and
determining the selected at least one resolution based on one or more of the first weight, the second weight, or the third weight.

24. A wireless communication device, comprising:
a display;
a screen generator configured to generate a screen;
a resolution selector configured to select a resolution for rendering the screen based on a set of parameters associated with the screen, wherein the set of parameters includes one or more types of screen objects of the screen, and wherein the one or more types of screen objects includes at least one of a text object, an image object, or a video object; and
a graphics processing unit (GPU) configured to render the screen with the selected resolution on the display;

wherein the text object is assigned a first resolution priority, the image object is assigned a second resolution priority, and the video object is assigned a third resolution priority;

wherein the resolution selector comprises a neural network configured to:

receive the first resolution priority, the second resolution priority, and the third resolution priority;

generate, using a loss function based on resource consumption associated with rendering the screen, a first weight associated with the first resolution priority, a second weight associated with the second resolution priority, and a third weight associated with the third resolution priority; and determine the selected resolution based on one or more of the first weight, the second weight, or the third weight as an input to the neural network.

* * * * *